United States Patent
Li et al.

(10) Patent No.: US 11,691,881 B2
(45) Date of Patent: Jul. 4, 2023

(54) CARBONIZED AMINO ACID MODIFIED LIGNIN AND PREPARATION METHOD THEREFOR

(71) Applicant: JIANGNAN UNIVERSITY, Wuxi (CN)

(72) Inventors: Ying Li, Wuxi (CN); Gang Shi, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 17/985,191

(22) Filed: Nov. 11, 2022

(65) Prior Publication Data

US 2023/0074971 A1 Mar. 9, 2023

(51) Int. Cl.
*C01B 32/348* (2017.01)
*C08H 7/00* (2011.01)
(Continued)

(52) U.S. Cl.
CPC .......... *C01B 32/348* (2017.08); *C01B 32/318* (2017.08); *C08H 6/00* (2013.01); *H01G 11/34* (2013.01); *C01P 2006/40* (2013.01)

(58) Field of Classification Search
CPC ....... C01B 32/05; C01B 32/30; C01B 32/312; C01B 32/318; C01B 32/342;
(Continued)

(56) References Cited

U.S. PATENT DOCUMENTS

2012/0012035 A1* 1/2012 Blank ................ D21C 11/0007
530/502

FOREIGN PATENT DOCUMENTS

CN 104599861 A 5/2015
CN 105803583 A 7/2016
(Continued)

OTHER PUBLICATIONS

Li, Hongsheng, et al. "Three-dimensional hierarchical porous carbon derived from lignin for supercapacitors: Insight into the hydrothermal carbonization and activation." International Journal of Biological Macromolecules 166 (2021): 923-933.*
(Continued)

*Primary Examiner* — Richard M Rump
(74) *Attorney, Agent, or Firm* — CBM Patent Consulting, LLC (57) ABSTRACT

It is disclosed purifies industrial lignin, performs Mannich reaction on purified industrial lignin, aldehyde and amino acid, simultaneously dopes nitrogen and sulfur elements into lignin, and performs high-temperature activation to obtain the carbonized amino acid modified lignin in accordance with a principle of green chemistry; a porous carbon material is prepared from the carbonized amino acid modified lignin by means of a two-step activation method, and an electrochemical workstation is applied to investigate electrochemical performance of the carbonized amino acid modified lignin as a supercapacitor; layered porous carbon having high specific surface area is prepared, the layered porous carbon has high specific heat capacity and stable cycle performance without attenuation when the supercapacitor is prepared from the layered porous carbon, and the method used has a wide application prospect in the aspect of preparing a porous carbon material for the supercapacitor.

9 Claims, 8 Drawing Sheets

(51) Int. Cl.
*H01G 11/34* (2013.01)
*C01B 32/318* (2017.01)

(58) Field of Classification Search
CPC ........ C01B 32/348; C08H 6/00; H01G 11/34; C01P 2006/40; C07G 1/00
See application file for complete search history.

(56) References Cited

FOREIGN PATENT DOCUMENTS

| CN | 107089659 A | 8/2017 |
|----|-------------|--------|
| CN | 112927953 A | 6/2021 |

OTHER PUBLICATIONS

Lu, Qiu-Feng, et al. "Preparation and heavy metal ions biosorption of graft copolymers from enzymatic hydrolysis lignin and amino acids." Bioresource technology 104 (2012): 111-118.*

* cited by examiner

CARBONIZED AMINO ACID MODIFIED LIGNIN AND PREPARATION METHOD THEREFOR

CROSS REFERENCES

This application claims priority to Chinese Patent Application Ser. No. CN202111463531.0 filed on 2 Dec. 2021.

TECHNICAL FIELD

The present disclosure belongs to the field of new materials, and particularly relates to carbonized amino acid modified lignin and a preparation method therefor.

BACKGROUND ART

In modern industrial production, all kinds of energy will be used to maintain production and life. However, with shortage of fossil energy, the development of new energy has become an urgent need. It is necessary to develop green, environment-friendly and effective energy storage devices. A supercapacitor features high energy density, fast charging and discharging speed, and long cycle life. Lignin, as the second richest natural polymer on the earth, has a wide range of sources, rich resources, and low acquisition cost. The combination of the lignin and the supercapacitor has attracted extensive and close attention of researchers. Relevant documents show that a heteroatom doped lignin capacitor has excellent electrochemical performance and can effectively improve a Faraday capacitance of an electrode material as a capacitor.

As an important kind of biomass, the lignin supercapacitor has received extensive attention from the researchers. The lignin has a high content of carbon, a phenolic hydroxyl structure of which can be chemically modified to form benzoquinone groups. Reversible conversion occurs between the phenolic hydroxyl structure and the benzoquinone groups to provide pseudocapacitance, and to promote the transfer of conductive particles such as electrons and ions to a certain extent at the same time. A carbon material plays a role by providing surface attraction sites for charge storage. By reducing the cost of porous carbon and increasing energy density of the porous carbon, a lignin carbon material can be effectively used as the electrode material. Dipendu Saha et al. synthesized mesoporous carbon by taking pre-crosslinked lignin gel as a raw material and a surfactant as a pore forming agent, and used physical and chemical methods to activate the mesoporous carbon to obtain activated mesoporous carbon. The results showed that the porosity of the activated mesoporous carbon was increased by 1.5-6 times, and a cyclic voltammetry curve of a prepared electrode was approximately rectangular, which showed the ideal behavior of double-layer capacitance. Hui Li et al. used a synthesis method to develop a large-scale three-dimensional connected layered porous carbonaceous monolithic column, which had an ideal microstructure, high conductivity, excellent area/volume capacitance under the condition of high-quality load and excellent cycle performance. Zhewei Yang et al. prepared lignin based porous carbon by adjusting a porous structure and a graphitization degree and using a method combining freeze-drying with activation, and used an obtained product as the electrode material of the lithium ion capacitor. The results showed that the material had excellent electrochemical performance, and graphite carbon synthesized with the aid of a catalyst further had high platform capacity and energy density. Jeong Hee Park et al. synthesized cross-linked lignin hydrogel electrolyte by means of ring opening polymerization, which had excellent mechanical stability and high ionic conductivity. By combining the cross-linked lignin hydrogel electrolyte with electrospun lignin/polyacrylonitrile nanofiber electrode, an all lignin based flexible supercapacitor was prepared, which had high capacitance, a capacitance retention rate after 10,000 cycles reaching up to 95%, and excellent flexibility and durability under different bending angles.

The latest progress of the lignin based supercapacitor in recent years is summarized. It can be seen that preparation of high-performance energy storage materials by combining metal oxides or conductive polymers with lignin has become a new research hotspot. The transformation of the industrial structure has promoted the development of the research field of the supercapacitor energetically towards green, portable and non-toxic directions. An energy storage system has become diversified, and various modification methods have gradually become diversified. Fangyan Liu et al. used sulfate lignin, a by-product of a papermaking black liquid, as a raw material to prepare an oxygen nitrogen sulfur co-doped multilayer porous carbon material by using a direct pyrolysis method. The supercapacitor prepared from this raw material has high specific capacitance and excellent cycle stability. For another example, Jingqi Yang et al. firstly used plant protein and lignin as raw materials to synthesize a self-supporting nitrogen doped carbon fiber network for the supercapacitor in an acetic acid aqueous solution, and investigated the influence of the protein-lignin ratio on the morphology and electrochemical performance of carbon fibers. The results showed that the material had the specific capacitance capable of reaching 410 F/g, 95% of a capacity retention rate after 3000 times of charging and discharging, and potential as a novel efficient energy storage device.

For a carbon material, pore area, a pore diameter, a material structure, element types and specific surface area all have important influences on its capacitance performance. Researchers have done a lot of work in improving the specific surface area, optimizing the pore structure, and introducing pseudocapacitance to improve the capacitance performance of the carbon material. Since it is difficult to determine the complexity and structure of functional groups in the lignin, it is certainly difficult to optimize the lignin.

SUMMARY

The present disclosure provides carbonized amino acid modified lignin and a preparation method therefor in order to solve the above technical problem. By means of Mannich reaction among alkali lignin, aldehyde and amino acid, nitrogen and sulfur elements are simultaneously doped into lignin, and a porous carbon material is prepared from the lignin by means of a two-step high-temperature activation method, to obtain the carbonized amino acid modified lignin in accordance with a principle of green chemistry.

The present disclosure provides a preparation method for carbonized amino acid modified lignin. The preparation method includes:

(1) processing industrial lignin to obtain refined lignin;
(2) dispersing the refined lignin into water, adjusting pondus Hydrogenii (pH) to 9-11, adding aldehyde and amino acid for reaction, adjusting the pH to 4-5, and carrying out separation to obtain a modified lignin solid;
(3) carbonizing the modified lignin solid under a protective atmosphere, to obtain a carbonized solid; mixing the carbonized solid with alkali in a mas ratio of 1:5-7, dispersing a mixture into a solvent, and carrying out separation to obtain a carbon-alkali mixture; and (4) calcining the carbon-alkali mixture under the protective atmosphere, to obtain the carbonized amino acid modified lignin.

Preferably, in step (1), a treatment method includes: adding the industrial lignin into water, and ultrasonically treating and filtering a mixture to remove a suspended solid; and then, stirring a sample, simultaneously adding dilute hydrochloric acid into the sample to adjust pondus Hydrogenii (pH)=2-3, filtering a separated solid, washing the separated solid with water for many times, and then freezing and drying the separated solid.

Preferably, in step (2), a separation method includes: adjusting the pH to 4-5, carrying out precipitation, using centrifuge tubes for subpackage, carrying out ultrasonic cleaning and centrifugation, pouring a liquid, adding deionized water, and repeating the steps of centrifugation and ultrasonic treatment for many times until a solid is washed with deionized water to residues; and drying the solid overnight in a vacuum dryer at 60° C.-70° C.

Preferably, in step (2), a mixed solution is heated to 45° C.-55° C. before the aldehyde and the amino acid are added.

Preferably, in step (2), a reaction temperature ranges from 80° C. to 95° C., and reaction time ranges from 4 h to 6 h.

Preferably, in step (2), a mass ratio of the lignin, the aldehyde and the amino acid is 15-25:80-120:0.8-1.2:10-14; the aldehyde is formaldehyde or glyoxal; and the amino acid is methionine or cysteine.

Further, in step (3), the obtained modified lignin is put into a tubular combustion furnace, and under protection of an atmosphere of nitrogen, a temperature rise rate is set as 5° C./min, the temperature rises from a room temperature to 400° C.-600° C., the temperature is kept for 1-3 h, then the modified lignin is naturally cooled to the room temperature, and a carbonized sample is taken out.

Further, in step (3), the alkali is sodium hydroxide and/or potassium hydroxide.

Further, the solvent is a mixture of water and an organic solvent, and a volume ratio of the organic solvent to the water is 0-1:1; and the organic solvent is methanol or ethanol.

Further, in step (4), a dried carbon-alkali mixture is put into a nickel boat, and is put into a tubular combustion furnace anew, and under protection of an atmosphere of nitrogen, a temperature rise rate is 8° C./min, a temperature rises to 700° C. to 900° C., the temperature is kept for 1-3 h, then modified lignin is cooled, and a carbonized sample is taken out of the nickel boat.

The present disclosure further provides carbonized amino acid modified lignin prepared by the preparation method of any one of claims 1-8.

The present disclosure further provides a use of the carbonized amino acid modified lignin as an electrode plate in a supercapacitor.

Compared with the prior art, the technical solution of the present disclosure has the following advantages:

by means of reaction between the lignin and the amino acid, nitrogen and sulfur elements are doped into the lignin. Electrochemical performance of the modified lignin is obviously better than that of the lignin.

Layered porous carbon having high specific surface area is prepared, and when a supercapacitor is prepared from the layered porous carbon, the layered porous carbon has high specific heat capacity and stable cycle performance without attenuation.

BRIEF DESCRIPTION OF THE DRAWINGS

Description of reference numerals: a reaction condition optimization experiment is that under the condition that other conditions are unchanged, a reaction temperature is set as 80° C., 85° C., 90° C. and 95° C. respectively for reaction to obtain amino acid modified lignin of M-AL-80, M-AL-85, M-AL-90 and M-AL-95 respectively.

DETAILED DESCRIPTION OF THE EMBODIMENTS

The present disclosure will be further described below with reference to the drawings and particular examples, such that those skilled in the art may better understand and implement the present disclosure, but the examples listed are not intended to limit the present disclosure.

Example 1

Industrial lignin was added into water, and a mixture was ultrasonically treated and filtered to obtain a sample. Then, the sample was stirred, dilute hydrochloric acid was simultaneously added into the sample to adjust pH=2, and a separated solid was filtered, washed with deionized water for many times, then frozen and dried to obtain refined lignin.

20 g of lignin and 100 mL of water were poured into a three-necked flask containing a thermostatic water bath, a magneton, a drop funnel and a reflux condenser, and then the pondus Hydrogenii (pH) of the solution was adjusted with 0.1 mol/L sodium hydroxide solution to 9, and a temperature rose to 50° C. 1 g of formaldehyde and 12 g of methionine were carefully added, the temperature rose to 80° C., and Mannich reaction was carried out for 5 h. Finally, 0.1 mol/L hydrochloric acid was added, a solution precipitated at pH=4, centrifuge tubes were used for subpackaging the solution, ultrasonic cleaning and centrifugation were carried out, a liquid was poured out, deionized water was added, and the steps of centrifugation and ultrasonic treatment were repeated for many times until the solid was washed with deionized water to residue neutral. Finally, the solution was dried overnight in a vacuum dryer, to obtain an amino acid modified lignin solid, and the amino acid modified lignin solid was ground into powder.

The obtained modified lignin was put into a tubular combustion furnace, and under protection of an atmosphere of Na, a temperature rise rate was set as 5° C./min, the temperature rose from a room temperature to 500° C., the temperature was kept for 2 h, then the modified lignin was naturally cooled to 20° C., and a carbonized sample was taken out. 1 g of carbonized sample and 6 g of NaOH were weighed, 10 ml of ethanol and 10 ml of deionized water were added, ultrasonic dispersion was carried out for 30 min, and a mixture was put into an air blast dryer at 105° C. to dry and remove a solvent. Finally, a dried carbon-alkali mixture was added into a nickel boat, and then was put into the tubular combustion furnace anew, under protection of an atmosphere of Na, a temperature rise rate was 8° C./min, the temperature rose to 800° C., then, the temperature was kept for 2 h, and a solid was cooled and taken out the nickel boat. The solid was rinsed into a beaker with dilute hydrochloric acid, then transferred to a funnel, and sequentially washed with dilute hydrochloric acid and deionized water until a filtrate is neutral, and an obtained solid was dried to obtain M-AL-80.

Example 2

Industrial lignin was added into water, and a mixture was ultrasonically treated and filtered to obtain a sample. Then, the sample was stirred, dilute hydrochloric acid was simultaneously added into the sample to adjust pH=3, and a separated solid was filtered, washed with deionized water for many times, then frozen and dried to obtain refined lignin.

15 g of lignin and 80 mL of water were poured into a three-necked flask containing a thermostatic water bath, a magneton, a drop funnel and a reflux condenser, and then the pH of the solution was adjusted with 0.1 mol/L sodium hydroxide solution to 9, and a temperature rose to 45° C. 0.8 g of formaldehyde and 10 g of methionine were carefully added, the temperature rose to 85° C., and Mannich reaction was carried out for 4 h. Finally, 0.1 mol/L hydrochloric acid was added, a solution precipitated at pH=4, centrifuge tubes were used for subpackaging the solution, ultrasonic cleaning and centrifugation were carried out, a liquid was poured out, deionized water was added, and the steps of centrifugation and ultrasonic treatment were repeated for many times until the solid was washed with deionized water to residue neutral. Finally, the solution was dried overnight in a vacuum dryer, to obtain an amino acid modified lignin solid, and the amino acid modified lignin solid was ground into powder.

The obtained modified lignin was put into a tubular combustion furnace, and under protection of an atmosphere of Na, a temperature rise rate was set as 4° C./min, the temperature rose from a room temperature to 400° C., the temperature was kept for 3 h, then the modified lignin was naturally cooled to 20° C., and a carbonized sample was taken out. 1 g of carbonized sample and 6 g of NaOH were weighed, 15 ml of ethanol and 15 ml of deionized water were added, ultrasonic dispersion was carried out for 30 min, and a mixture was put into an air blast dryer for drying to a constant weight. Finally, a dried carbon-alkali mixture was added into a nickel boat, and then was put into the tubular combustion furnace anew, under protection of an atmosphere of Na, a temperature rise rate was 6° C./min, the temperature rose to 700° C., then, the temperature was kept for 1 h, and a solid was cooled and taken out the nickel boat. The solid was rinsed into a beaker with dilute hydrochloric acid, then transferred to a funnel, and sequentially washed with dilute hydrochloric acid and deionized water until a filtrate is neutral, and an obtained solid was dried to obtain M-AL-85.

Example 3

Industrial lignin was added into water, and a mixture was ultrasonically treated and filtered to obtain a sample. Then, the sample was stirred, dilute hydrochloric acid was simultaneously added into the sample to adjust pH=2, and a separated solid was filtered, washed with deionized water for many times, then frozen and dried to obtain refined lignin.

25 g of lignin and 120 mL of water were poured into a three-necked flask containing a thermostatic water bath, a magneton, a drop funnel and a reflux condenser, and then the pH of the solution was adjusted with 0.1 mol/L sodium hydroxide solution to 11, and a temperature rose to 55° C. 1.2 g of formaldehyde and 14 g of methionine were carefully added, the temperature rose to 90° C., and Mannich reaction was carried out for 6 h. Finally, 0.1 mol/L hydrochloric acid was added, a solution precipitated at pH=5, centrifuge tubes were used for subpackaging the solution, ultrasonic cleaning and centrifugation were carried out, a liquid was poured out, deionized water was added, and the steps of centrifugation and ultrasonic treatment were repeated for many times until the solid was washed with deionized water to residue neutral. Finally, the solution was dried overnight in a vacuum dryer, to obtain an amino acid modified lignin solid, and the amino acid modified lignin solid was ground into powder.

The obtained modified lignin was put into a tubular combustion furnace, and under protection of an atmosphere of Na, a temperature rise rate was set as 6° C./min, the temperature rose from a room temperature to 600° C., the temperature was kept for 1 h, then the modified lignin was naturally cooled to 30° C., and a carbonized sample was taken out. 1 g of carbonized sample and 6 g of NaOH were weighed, 5 ml of ethanol and 5 ml of deionized water were added, ultrasonic dispersion was carried out for 30 min, and a mixture was put into an air blast dryer for drying to a constant weight. Finally, a dried carbon-alkali mixture was added into a nickel boat, and then was put into the tubular combustion furnace anew, under protection of an atmosphere of Na, a temperature rise rate was 10° C./min, the temperature rose to 900° C., then, the temperature was kept for 3 h, and a solid was cooled and taken out the nickel boat. The solid was rinsed into a beaker with dilute hydrochloric acid, then transferred to a funnel, and sequentially washed with dilute hydrochloric acid and deionized water until a filtrate is neutral, and an obtained solid was dried to obtain M-AL-90.

Example 4

Industrial lignin was added into water, and a mixture was ultrasonically treated and filtered to obtain a sample. Then, the sample was stirred, dilute hydrochloric acid was simultaneously added into the sample to adjust pH=3, and a separated solid was filtered, washed with deionized water for many times, then frozen and dried to obtain refined lignin.

15 g of lignin and 80 mL of water were poured into a three-necked flask containing a thermostatic water bath, a magneton, a drop funnel and a reflux condenser, and then the pH of the solution was adjusted with 0.1 mol/L potassium hydroxide solution to 9, and a temperature rose to 45° C. 0.8 g of formaldehyde and 10 g of methionine were carefully added, the temperature rose to 95° C., and Mannich reaction was carried out for 4 h. Finally, 0.1 mol/L hydrochloric acid was added, a solution precipitated at pH=4, centrifuge tubes were used for subpackaging the solution, ultrasonic cleaning and centrifugation were carried out, a liquid was poured out, deionized water was added, and the steps of centrifugation and ultrasonic treatment were repeated for many times until the solid was washed with deionized water to residue neutral. Finally, the solution was dried overnight in a vacuum dryer, to obtain an amino acid modified lignin solid, and the amino acid modified lignin solid was ground into powder.

The obtained modified lignin was put into a tubular combustion furnace, and under protection of an atmosphere of He, a temperature rise rate was set as 4° C./min, the temperature rose from a room temperature to 400° C., the temperature was kept for 3 h, then the modified lignin was naturally cooled to 20° C., and a carbonized sample was taken out. 1 g of carbonized sample and 6 g of KOH were weighed, 15 ml of ethanol and 15 ml of deionized water were added, ultrasonic dispersion was carried out for 30 min, and a mixture was put into an air blast dryer for drying to a constant weight. Finally, a dried carbon-alkali mixture was added into a nickel boat, and then was put into the tubular combustion furnace anew, under protection of an atmosphere of He, a temperature rise rate was 6° C./min, the temperature rose to 700° C., then, the temperature was kept for 1 h, and a solid was cooled and taken out the nickel boat. The solid was rinsed into a beaker with dilute hydrochloric acid, then transferred to a funnel, and sequentially washed with dilute hydrochloric acid and deionized water until a filtrate is neutral, and an obtained solid was dried to obtain M-AL-95.

Example 5

Industrial lignin was added into water, and a mixture was ultrasonically treated and filtered to obtain a sample. Then, the sample was stirred, dilute hydrochloric acid was simultaneously added into the sample to adjust pH=2, and a separated solid was filtered, washed with deionized water for many times, then frozen and dried to obtain refined lignin.

25 g of lignin and 120 mL of water were poured into a three-necked flask containing a thermostatic water bath, a magneton, a drop funnel and a reflux condenser, the pH of the solution was adjusted with 0.1 mol/L sodium hydroxide solution to 11, and a temperature rose to 55° C. 0.8 g of glyoxal and 14 g of cysteine were carefully added, the temperature rose to 90° C., and Mannich reaction was carried out for 6 h. Finally, 0.1 mol/L hydrochloric acid was added, a solution precipitated at pH=5, centrifuge tubes were used for subpackaging the solution, ultrasonic cleaning and centrifugation were carried out, a liquid was poured out, deionized water was added, and the steps of centrifugation and ultrasonic treatment were repeated for many times until the solid was washed with deionized water to residue neutral. Finally, the solution was dried overnight in a vacuum dryer, to obtain an cysteine modified lignin solid, and the cysteine modified lignin solid was ground into powder.

The obtained modified lignin was put into a tubular combustion furnace, and under protection of an atmosphere of $N_2$, a temperature rise rate was set as 6° C./min, the temperature rose from a room temperature to 600° C., the temperature was kept for 1 h, then the modified lignin was naturally cooled to 30° C., and a carbonized sample was taken out. 1 g of carbonized sample and 6 g of NaOH were weighed, 5 ml of ethanol and 5 ml of deionized water were added, ultrasonic dispersion was carried out for 30 min, and a mixture was put into an air blast dryer for drying to a constant weight. Finally, a dried carbon-alkali mixture was added into a nickel boat, and then was put into the tubular combustion furnace anew, under protection of an atmosphere of Na, a temperature rise rate was 10° C./min, the temperature rose to 900° C., then, the temperature was kept for 3 h, and a solid was cooled and taken out the nickel boat. The solid was rinsed into a beaker with dilute hydrochloric acid, then transferred to a funnel, and sequentially washed with dilute hydrochloric acid and deionized water until a filtrate is neutral, and an obtained solid was dried to obtain carbonized cysteine modified lignin.

Effect Evaluation 1

Figure 1:
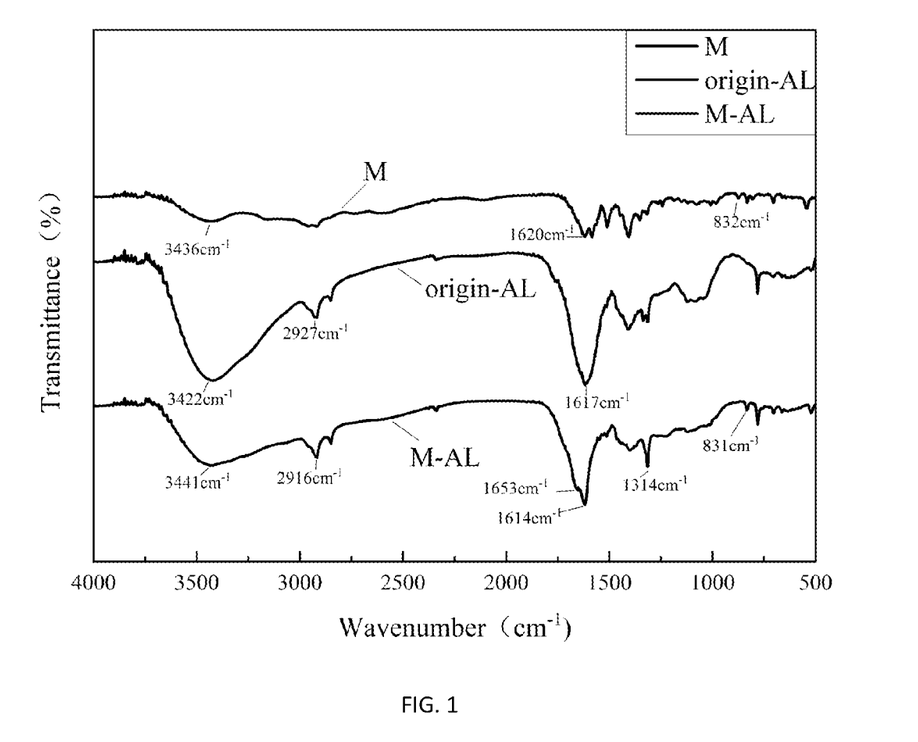
FIG. 1 is an infrared spectrogram of methionine (M), refined lignin (origin-AL) and modified lignin (M-AL).

In FIG. 1, a peak at 3422 $cm^{-1}$ of refined lignin (origin-AL) is a hydroxyl peak containing water in potassium bromide, and methionine and M-AL also have hydroxyl infrared absorption peaks 3436 $cm^{-1}$ and 3441 $cm^{-1}$; the origin-AL and M-AL have C—H absorption peaks on a benzene ring at 2927 $cm^{-1}$ and 2916 $cm^{-1}$ respectively, and carbonyl absorption peaks at 1617 $cm^{-1}$ and 1614 $cm^{-1}$, which indicates that a skeleton is basically maintained before and after lignin activation reaction without any fundamental change. An absorption peak at 1620 $cm^{-1}$ of the methionine corresponds to a N—H absorption peak on a primary amine group, and an absorption peak at 832 $cm^{-1}$ of the methionine corresponds to a C—S bond absorption peak. Infrared absorption peaks at 1653 $cm^{-1}$, 1314 $cm^{-1}$ and 831 $cm^{-1}$ on M-AL correspond to a C—N bond absorption peak, a N—H bond absorption peak and a C—S bond absorption peak respectively, which indicates that Mannich reaction successfully occurs between the lignin and the methionine, to ad amino and sulfur elements into a lignin structure.

Effect Evaluation 2

Figure 2:
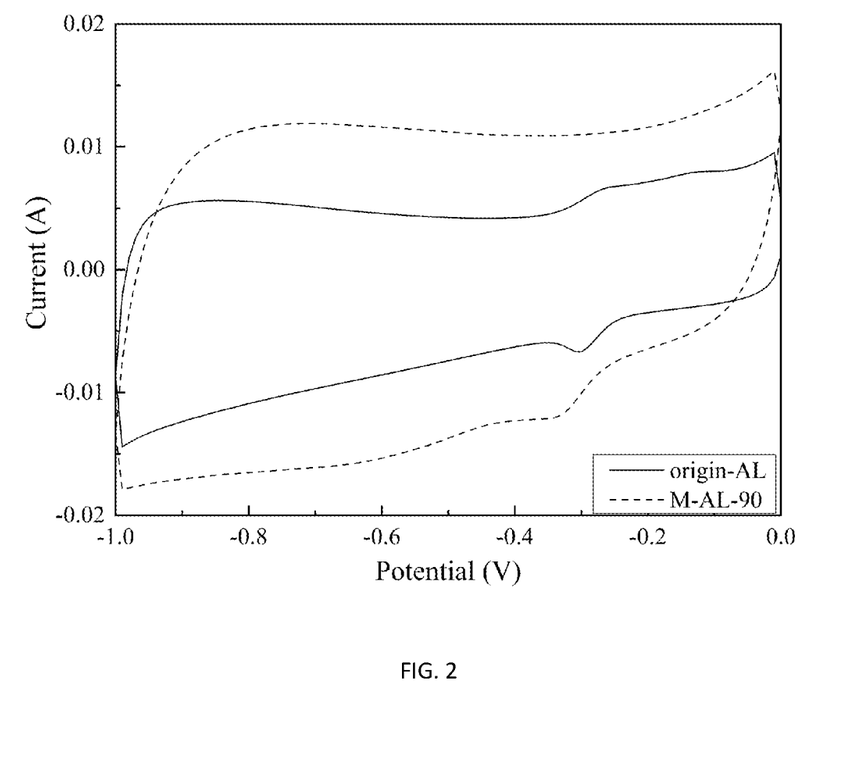
FIG. 2 is a curve graph of thermogravimetric analysis of M, origin-AL and M-AL.

Energy consumed during pyrolysis of lignin is highly related to the type and structure of elements that the lignin contains. As shown in FIG. 2, pyrolysis of two kinds of lignin may be divided into three stages. A first stage is before 180° C., in this case, there is no obvious thermal weightlessness due to drying before a test, because water is basically removed, and chemical components are basically unchanged. A second stage is from 180° C. to 410° C., the two kinds of lignin both have serious thermal weightlessness, but a weight loss rate of M-AL is low, which indicates that an internal structure is stable at this stage and is not easy to damage. As heating continues, each component of the two kinds of lignin decomposes violently, thereby producing a lot of gas and derivatives such as tar. A third stage is from 410° C. to 900° C., the weight loss of the two kinds of lignin slows down, and the mass of the lignin decreases more, which indicates that the modified lignin has basically better thermal stability.

Effect Evaluation 3

Figure 3:
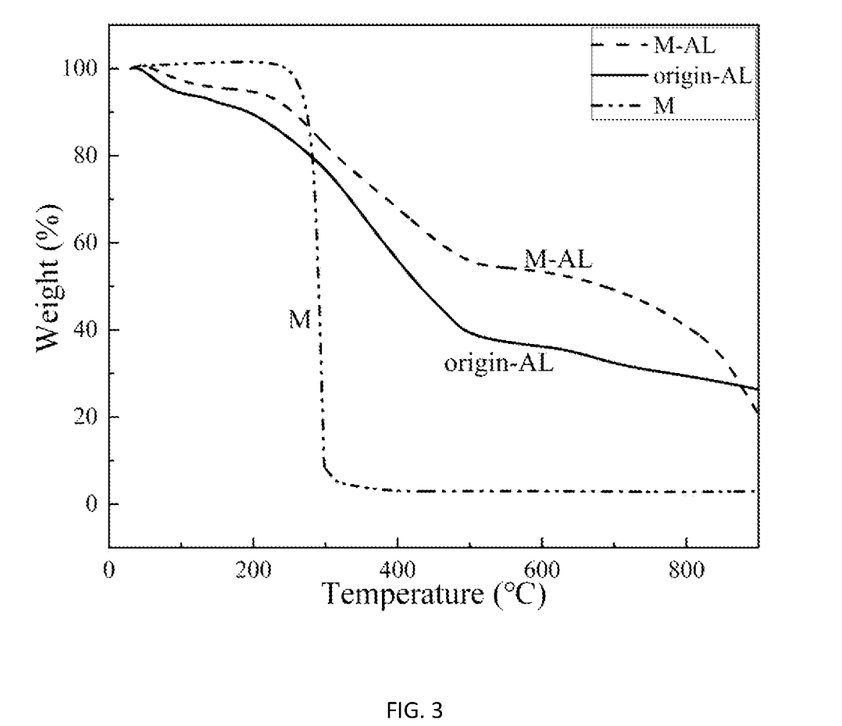
FIG. 3 is current-potential (CV) cycle of origin-AL and M-AL-90 electrode materials at a scanning rate of 10 mV·s$^{-1}$ in a 6M KOH solution.

It may be seen from FIG. 3 that at a scanning rate of 10 $mV \cdot s^{-1}$, an origin-AL electrode material has a number of redox peaks, which indicates that there are many pseudo-capacitances that present incomplete and rugged rectangles, and are slightly similar to triangles, which indicates that there is a slightly obvious ion screening effect. However, M-AL-90 is nearly rectangular, which indicates that the M-AL-90 has excellent electric double layer capacitance properties and less redox reaction. A formula for computing specific capacitance C according to cyclic voltammetry is as follows:

$$C=S/(2*m*v*\Delta V) \quad (3\text{-}1)$$

S is area of a closed curve, m is the mass (g) of an active substance, v is a scanning rate, $mV \cdot s^{-1}$, and $\Delta V$ is a scanning potential difference.

The origin-AL supercapacitor having specific capacitance being 80.625 F/g is obtained; and the M-AL-90 supercapacitor having specific capacitance being 140.625 F/g is obtained. It is proved that lignin modified by Mannich reaction has better transport capacity for ions/electrons.

Effect Evaluation 4

Figure 4:
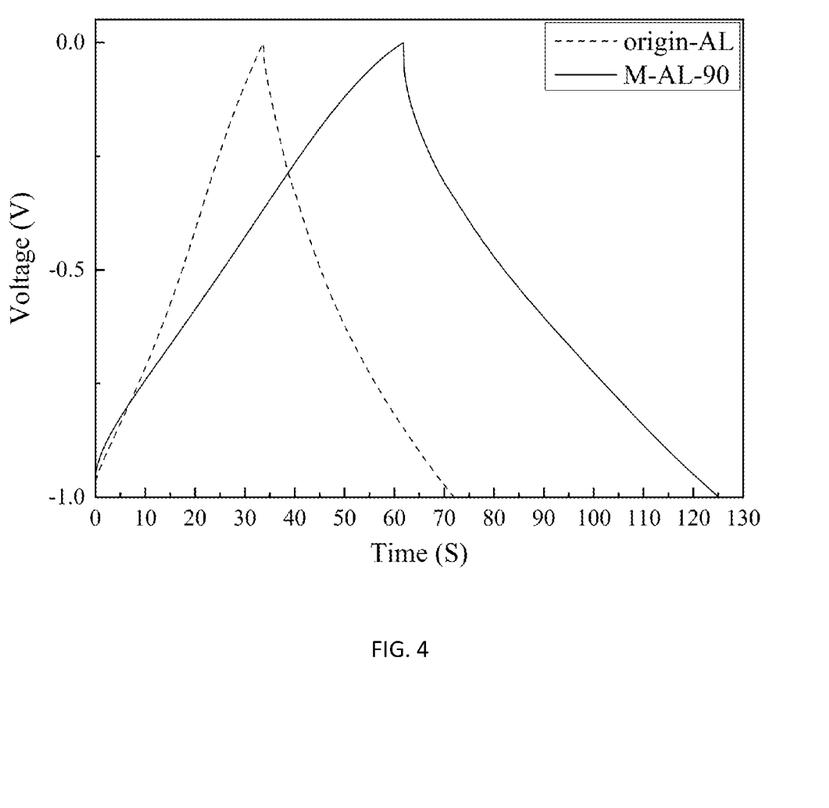
FIG. 4 is a charging and discharging curve graph of origin-AL and M-AL-90 electrode materials at a current density of 2 A/g in a 6M KOH solution.

FIG. 4 shows a constant-current charging and discharging curve of origin-AL and M-AL-90 electrode materials at a current density of 2 A/g. This method is also called as chronopotentiometry. The figures of two samples are compared, and symmetry of methionine modified lignin is obviously better than that of a lignin material, which indicates that the methionine modified lignin has better reversibility and greater specific capacitance. According to a formula:

$$C=(i*\Delta t)/(m*\Delta V) \quad (3\text{-}2)$$

i is constant discharge current (A), $\Delta T$ is discharge time (s), m is the mass (g) of an electrode active substance, and $\Delta V$ is a potential difference.

At a current density of 2A/g, specific capacitance of origin-AL and M-AL-90 is 76.08 F/g and 126.88 F/g respectively. Capacitance performance of methionine modified lignin is obviously better than that of lignin.

Effect Evaluation 5

Figure 5:
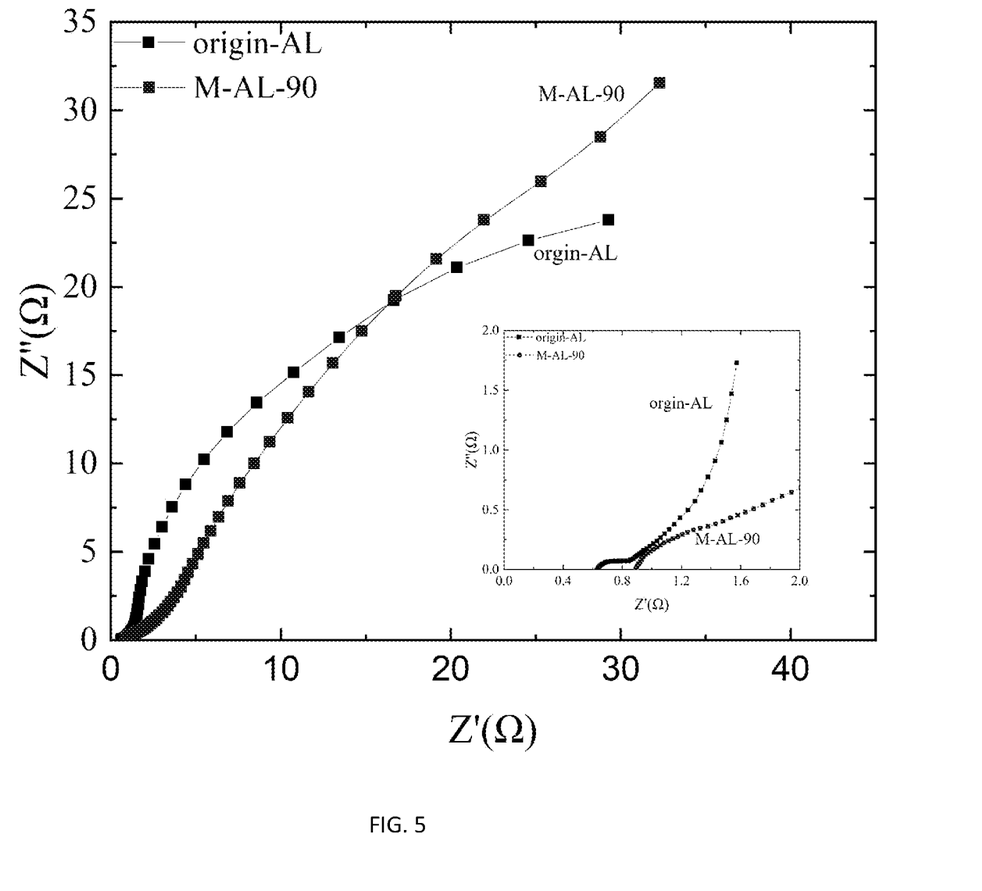
FIG. 5 is a fitted curve graph of alternating-current impedance of origin-AL and M-AL-90.

Alternating current impedance spectroscopy is used to characterize interface characteristics between an electrode and electrolyte of a supercapacitor, which may provide information about an internal resistance of an electrode material and a resistance between the electrode and the electrolyte. FIG. 5 shows a Nyquist curve of two electrodes. An included angle between amino acid modified lignin and a horizontal axis is larger than that of origin-AL in a low frequency area, which indicates that the amino acid modified lignin has a more ideal capacitance behavior. In addition, lines of the amino acid modified lignin and the origin-AL are not vertical enough herein, which may be caused by an excessive concentration of the electrolyte, such that a diameter of hydrated ions become larger and is difficult to diffuse towards micropores. An intersection point of the curve and a real axis in a high frequency area is an equivalent series internal resistance, that is, a resistance of a system consisting of electrolyte resistance and interface. An image shows that an intersection point of the origin-AL is smaller (0.69), that is, the origin-AL has a smaller internal resistance.

Figure 6:
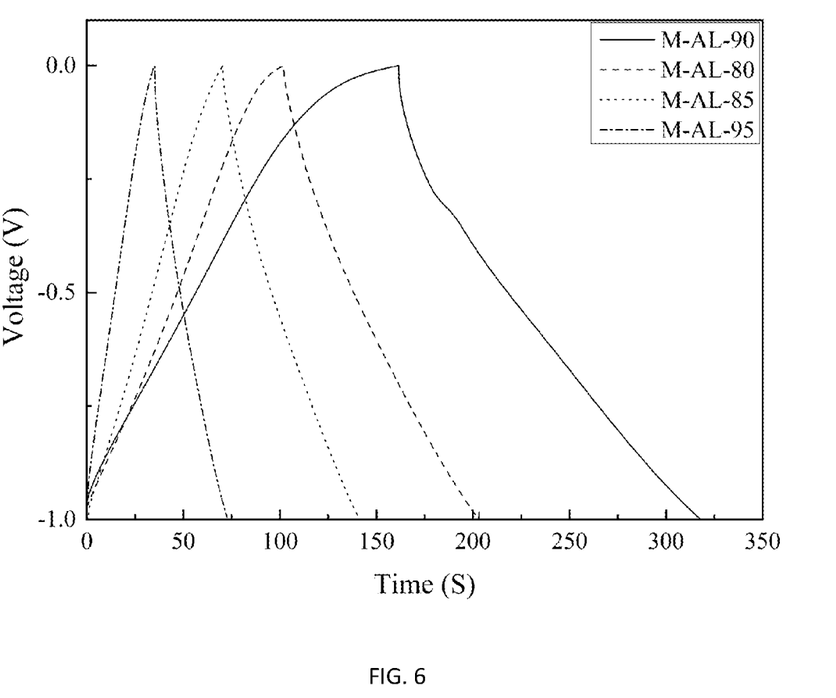
FIG. 6 is a charging and discharging curve graph of M-AL-90, M-AL-80, M-AL-85 and M-AL-95 at a current density of 1 A/g in a 6M KOH solution.

According to FIG. 6 and a computation formula of specific capacitance, the specific capacitance of M-AL-90, M-AL-80, M-AL-85 and M-AL-95 is 158.0 F/g, 97.8 F/g, 70.6 F/g and 36.8 F/g respectively. When other conditions are unchanged and a reaction temperature is 90° C., the synthesized modified lignin has the best performance, and a figure presenting a symmetrical triangle, which indicates that reversibility of the material is excellent.

Effect Evaluation 6

Figure 7:
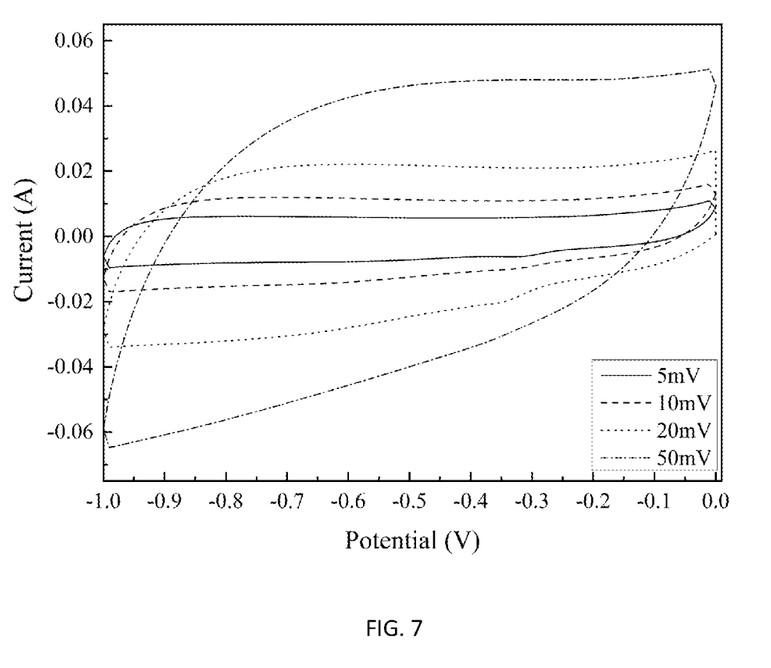
FIG. 7 is a CV graph of M-AL-90 in a 6M KOH solution at scanning rates of 5 mV s$^{-1}$, 10 mV s$^{-1}$, 20 mV s$^{-1}$ and 50 mV s$^{-1}$.

As shown in FIG. 7, with increase of a scanning rate, a cyclic voltammetry curve of M-AL-90 is distorted to a certain extent. At the scanning rate reaching up to $50\,mV\,s^{-1}$, the cyclic voltammetry curve still remains a relatively complete rectangular, which shows excellent ion transport behaviors and fast charge transmission capacity. The excellent characteristic is closely related to nitrogen and sulfur elements successfully doped into lignin in the form of amino and carbon sulfur bonds. There are obvious redox peaks at a low scanning speed, which indicates presence of pseudocapacitance, which is due to redox reaction of doped nitrogen and sulfur atoms during a charging and discharging process.

Figure 8:
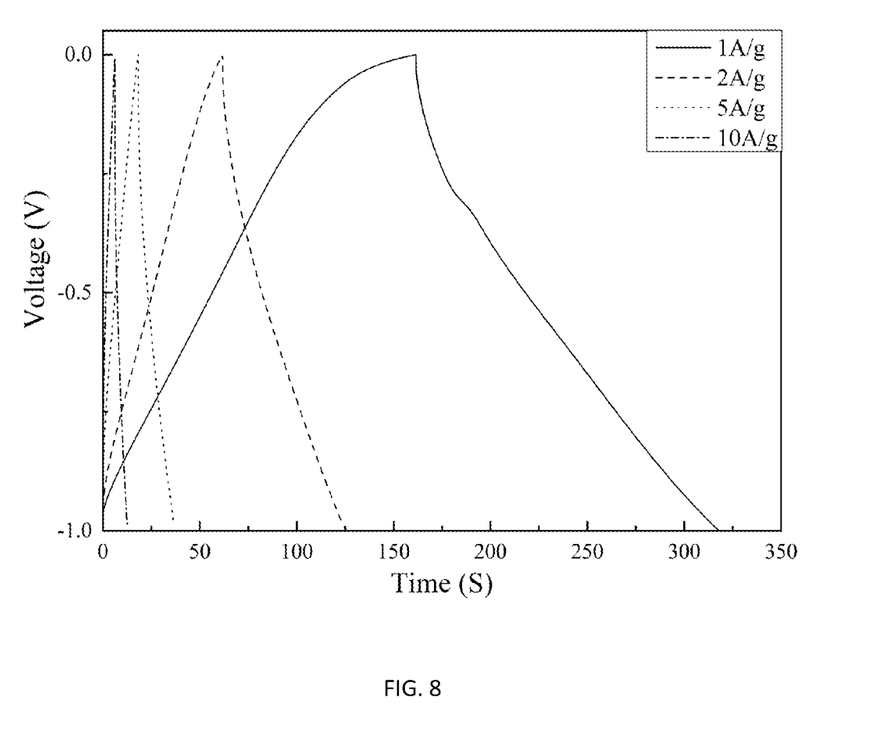
FIG. 8 is a charging and discharging graph of M-AL-90 in a 6M KOH solution at a current density of 1 A/g, 2 A/g, 5 A/g and 10 A/g.

As a current density is increased gradually in FIG. 8, the specific capacitance of the M-AL-90 is sequentially decreased, which is 159 F/g, 123.4 F/g, 95 F/g and 64 F/g respectively, and a capacitance retention rate of the M-AL-90 is 40.25%. A constant current charging and discharging image of 1 A/g presents some pseudocapacitance characteristics, which proves that the capacitance of this kind of supercapacitor consists of a double-layer capacitance and a pseudocapacitance.

Use of cysteine instead of methionine as an amino acid modification reactant produces similar effects, which will not be repeated herein.

An electrode plate is prepared from the carbonized amino acid modified lignin prepared by the present disclosure, and is used as a supercapacitor. After being characterized by cyclic voltammetry, constant current charging and discharging and alternating current impedance testing, it is proved that the carbonized amino acid modified lignin has excellent electrical performance.

Obviously, the above examples are only examples for clear explanation, and do not limit the implementation mode. For those of ordinary skill in the pertinent field, other different forms of variations and modifications may further be made on the basis of the above description. It is unnecessary to exhauste all implementations herein. Obvious changes or modifications derived therefrom are still within the scope of protection of the present disclosure.

What is claimed is:

1. A preparation method for carbonized amino acid modified lignin, comprising:
   (1) processing industrial lignin to obtain refined lignin;
   (2) dispersing the refined lignin into water, adjusting pondus Hydrogenii (pH) to 9-11, adding aldehyde and amino acid for reaction, adjusting the pH to 4-5, and carrying out separation to obtain a modified lignin solid;
   (3) carbonizing the modified lignin solid under a protective atmosphere, to obtain a carbonized solid; mixing the carbonized solid with alkali in a mass ratio of 1:5-7, dispersing a mixture into a solvent, and carrying out separation to obtain a carbon-alkali mixture; and
   (4) calcining the carbon-alkali mixture under the protective atmosphere, to obtain the carbonized amino acid modified lignin.

2. The preparation method according to claim 1, wherein in step (1), a treatment method comprises: adding the industrial lignin into water, carrying out separation, adjusting the pH to 2-3, and carrying out purification and drying.

3. The preparation method according to claim 1, wherein in step (2), a mixed solution is heated to 45° C.-55° C. before the aldehyde and the amino acid are added.

4. The preparation method according to claim 1, wherein in step (2), a reaction temperature ranges from 80° C. to 95° C., and reaction time ranges from 4 h to 6 h.

5. The preparation method according to claim 1, wherein in step (2), a mass ratio of the lignin, the aldehyde and the amino acid is 15-25:0.8-1.2:10-14; the aldehyde is formaldehyde or glyoxal; and the amino acid is methionine or cysteine.

6. The preparation method according to claim 1, wherein in step (3), a carbonization temperature ranges from 400° C. to 600° C., and carbonization time ranges from 1 h to 3 h.

7. The preparation method according to claim 1, wherein
in step (3), the alkali is sodium hydroxide and/or potassium hydroxide; and
the solvent is a mixture of water and an organic solvent, and a volume ratio of the organic solvent to the water is 0-1:1; and the organic solvent is methanol or ethanol.

8. The preparation method according to claim 1, wherein in step (4), a calcination temperature ranges from 700° C. to 900° C., and calcination time ranges from 1 h to 3 h.

9. The preparation method according to claim 1, wherein the carbonized amino acid modified lignin is used for preparing an electrode for a supercapacitor.

\* \* \* \* \*